April 18, 1939.      R. T. KNAPP      2,154,456
ROTARY MACHINE
Filed Jan. 30, 1937      5 Sheets-Sheet 1

INVENTOR.
ROBERT T. KNAPP
BY
ATTORNEYS.

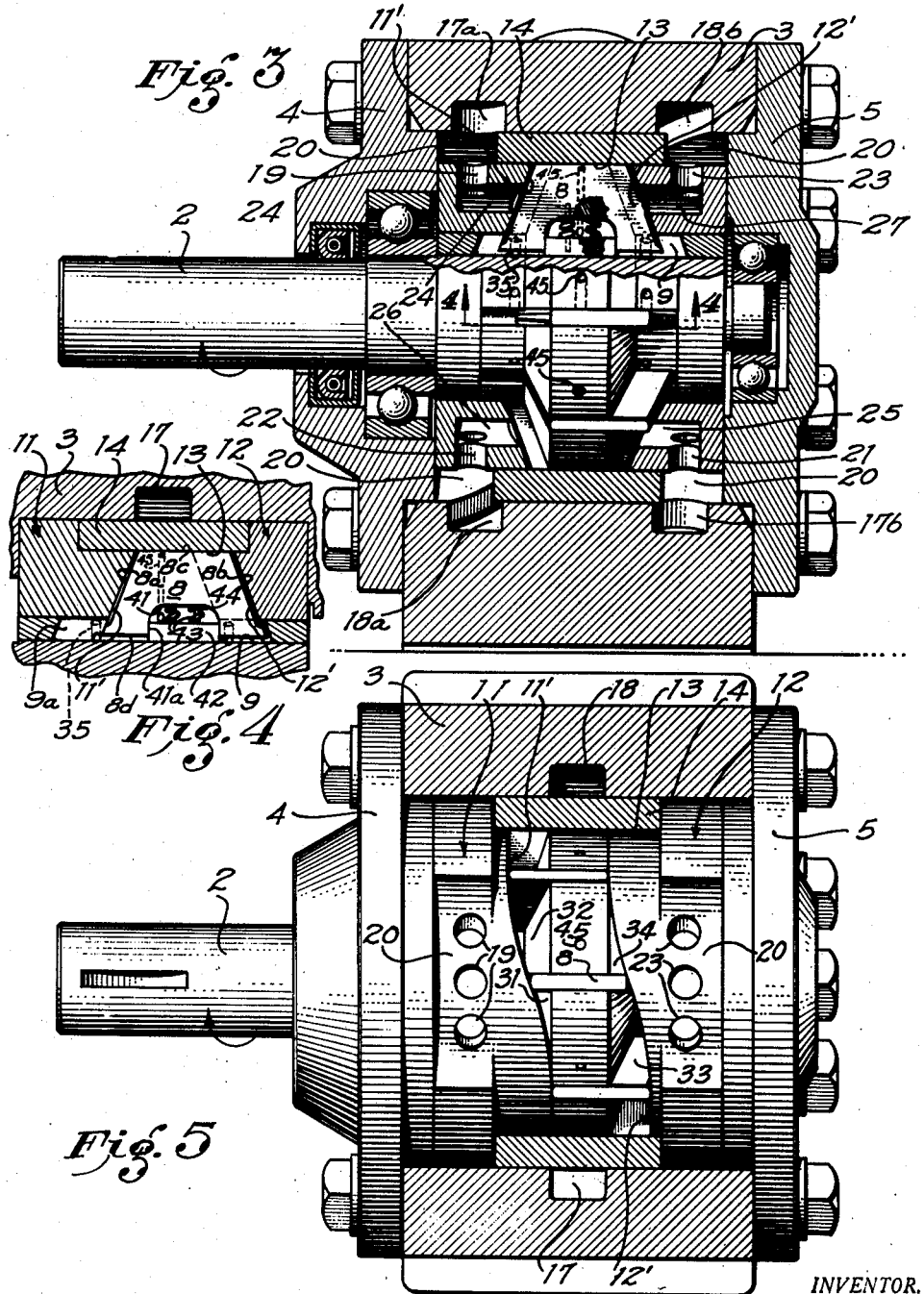

April 18, 1939. R. T. KNAPP 2,154,456
ROTARY MACHINE
Filed Jan. 30, 1937 5 Sheets-Sheet 3

INVENTOR.
ROBERT T. KNAPP
BY
ATTORNEYS.

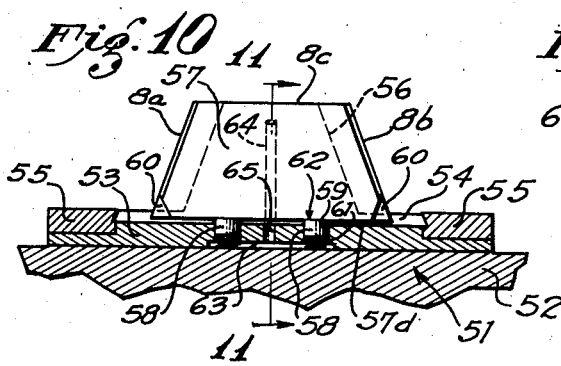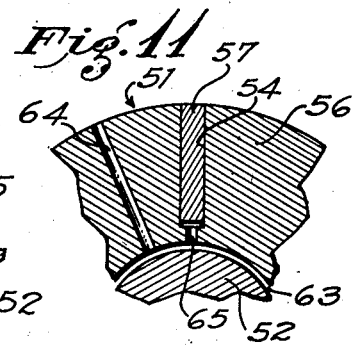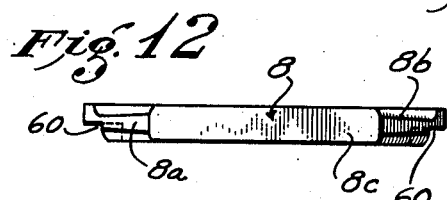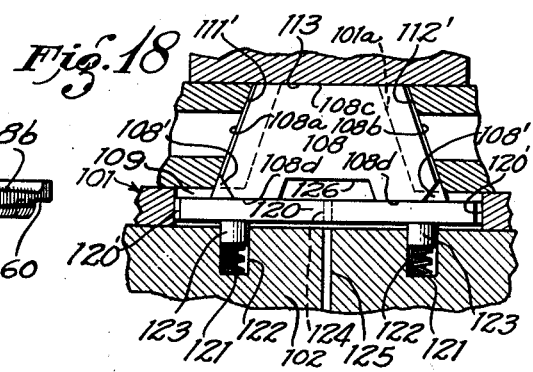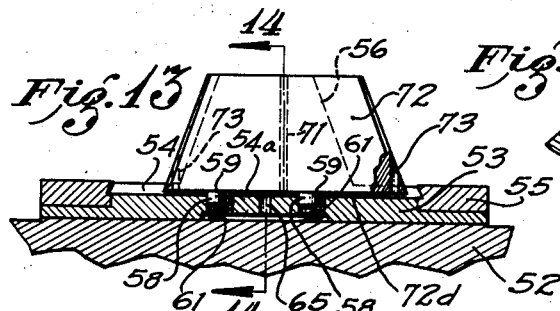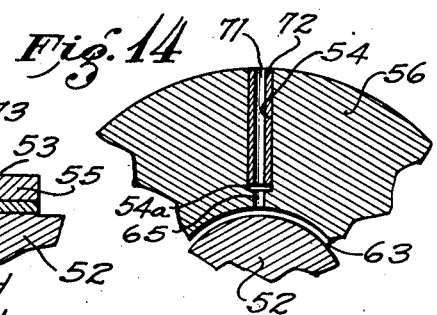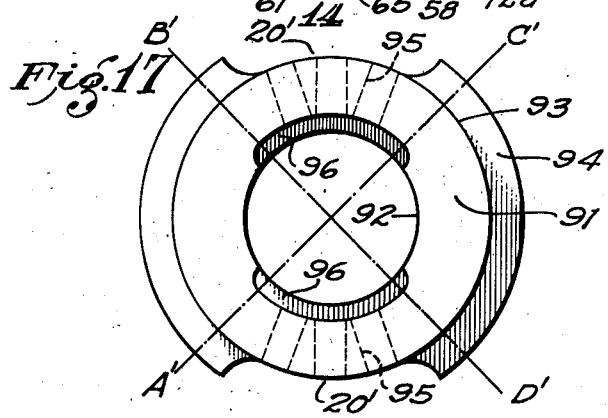

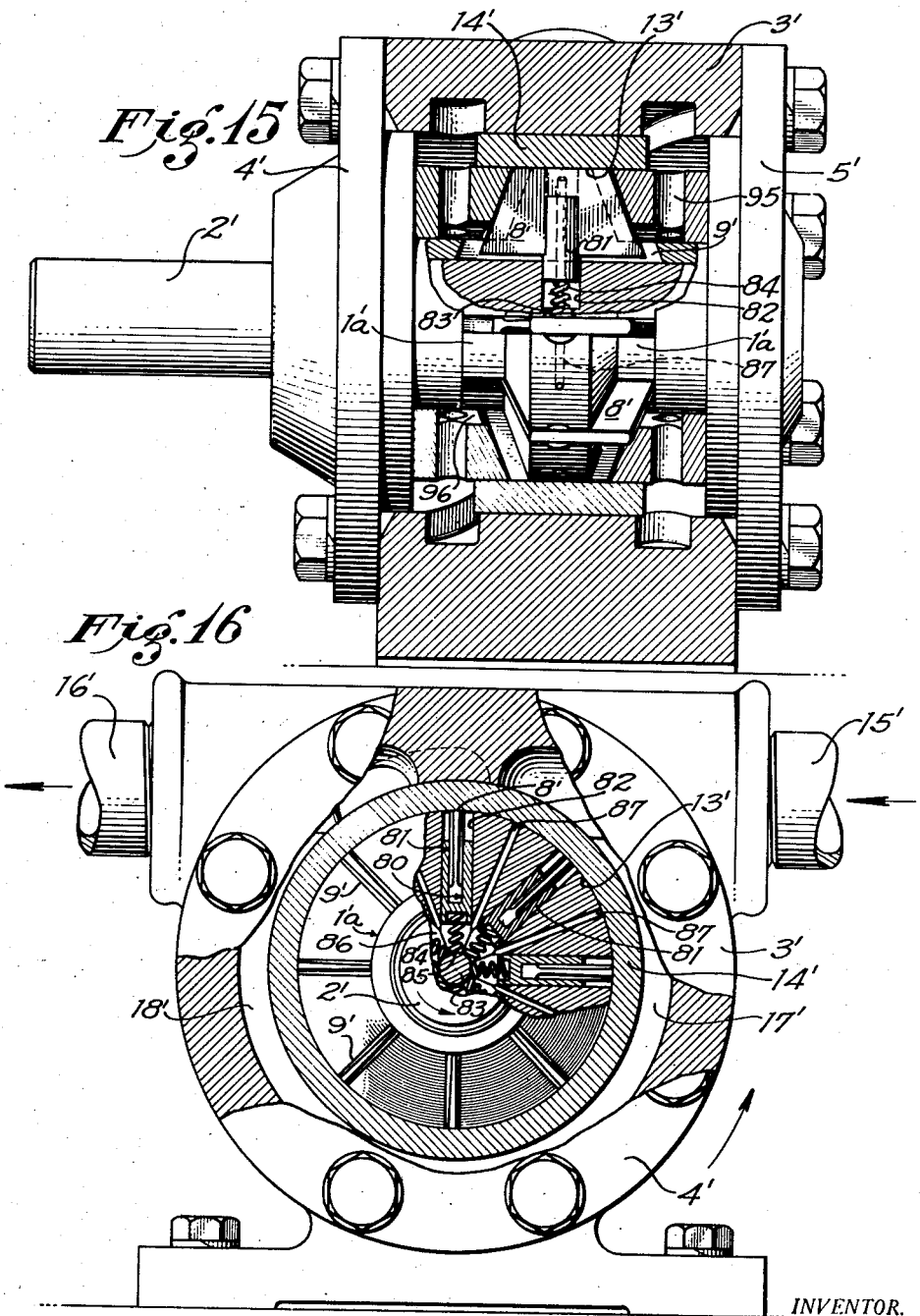

Patented Apr. 18, 1939

2,154,456

UNITED STATES PATENT OFFICE

2,154,456

ROTARY MACHINE

Robert T. Knapp, Pasadena, Calif., assignor of thirty-three and one-third per cent to Rudolph A. Riek and thirty-three and one-third per cent to Forest O. Riek, both of Los Angeles, Calif.

Application January 30, 1937, Serial No. 123,237

23 Claims. (Cl. 103—139)

This invention relates to positive fluid displacement rotary machines and pertains particularly to a fluid displacement rotary machine of the laterally reciprocating vane type. The herein described features are particularly applicable to that type of machine described in my issued Patent No. 2,020,611, but certain of these features are applicable to other types of reciprocating vane-type displacement rotary machines.

The invention is particularly directed to that type of rotary machine which embodies a rotor member mounted within a concentric rotor chamber or stator provided with co-actingly shaped end walls disposed at the opposite axial ends of said rotor and defining vane guiding cams, and vane members mounted on said rotor and extending transversely with respect to a plane of rotation thereof in engagement with both of said guiding cams, said vane members being slidably mounted on said rotor for laterally reciprocating motion, that is, for motion in a direction transverse to a plane of rotation of the rotor. As described in the above-mentioned patent, the vanes are also slidable outwardly with respect to the axis of rotation, whereby the desired clearances are automatically maintained in the device during progressive wear on said vanes.

In this type of rotary machine the respective end walls of the housing together with the rotor define separate fluid displacement chambers of angularly variable volumetric capacity disposed at opposite ends of the rotor member, and due to the fact that these displacement chambers are necessary complements to one another so that the cross-section of the space between them, taken upon a plane passing through the plane of movement of one of the vane members, is identical in shape with all similarly taken cross-sections, it will be apparent that a considerable pressure difference will exist in the respective displacement chambers at a given circumferential position of a vane during rotative movement of the rotor to effect a lateral reciprocating movement of such vanes.

In view of the above, one of the important objects of the present invention is to provide means for neutralizing the pressure effect in the displacement chambers with respect to each individual operating vane, whereby such vane is subjected to equivalent and balanced pressure conditions, materially increasing the mechanical and volumetric efficiency of the device.

A further important object of the invention is to provide a rotor construction for a device of the above type, in which transverse leakage from one displacement chamber into the other is substantially prevented at points adjacent the positions of the operating vanes.

A further object of the invention is to provide, in a device of the character described, means for counterbalancing the inward pressure upon the reciprocating vanes by admitting fluid interiorly of the vane structure to apply a counterbalancing outward pressure thereto. A further object of the invention is to provide counterbalanced and equivalent inward and outward pressures at each end of the reciprocating vanes of a structure of the present type, whereby the tendency of the vanes to rock in their own planes is substantially eliminated.

A further object of the invention is to provide a rotor and vane construction for a device of the character above set forth, which permits free interflow of fluid between the displacement chambers and the spaces within the rotor adjacent the inward edge portions of the individual vanes, which spaces are necessarily provided to permit the desired reciprocation of the vanes, such free interflow of fluid serving to eliminate the possibility of quantities of fluid being trapped in these non-functional clearance spaces, and thus eliminate mechanical drag on the device without detracting from the volumetric efficiency thereof.

Further objects of the invention will be brought out in the following specific description thereof, or will be apparent from such description. The accompanying drawings show certain modifications of the invention and referring thereto:

Fig. 3 is a vertical longitudinal section thereof taken on line 3—3 in Fig. 2;

Fig. 4 is a detail of a portion thereof taken on line 4—4 in Fig. 3;

Fig. 5 is a horizontal partly sectional view taken on line 5—5 in Fig. 2;

Figure 1:
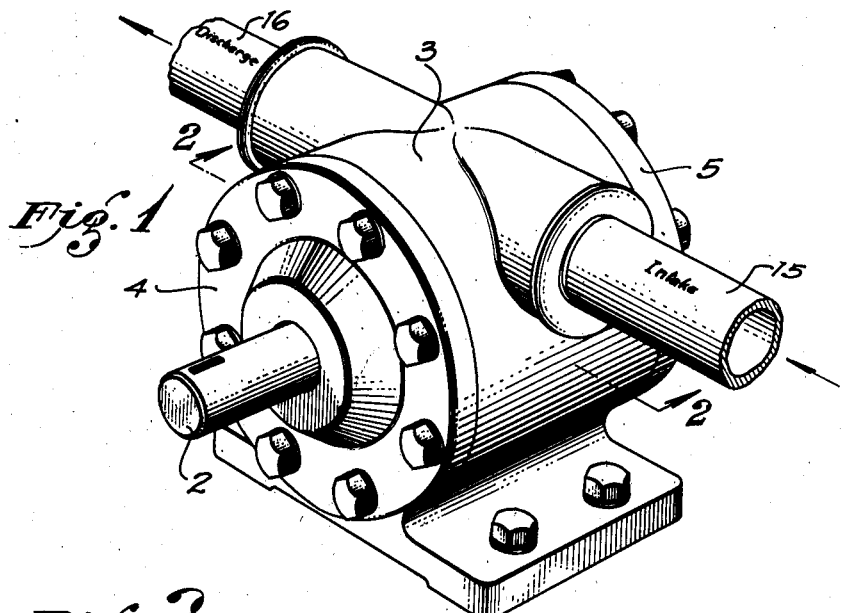
Fig. 1 is an external perspective view of the device.
Figure 2:
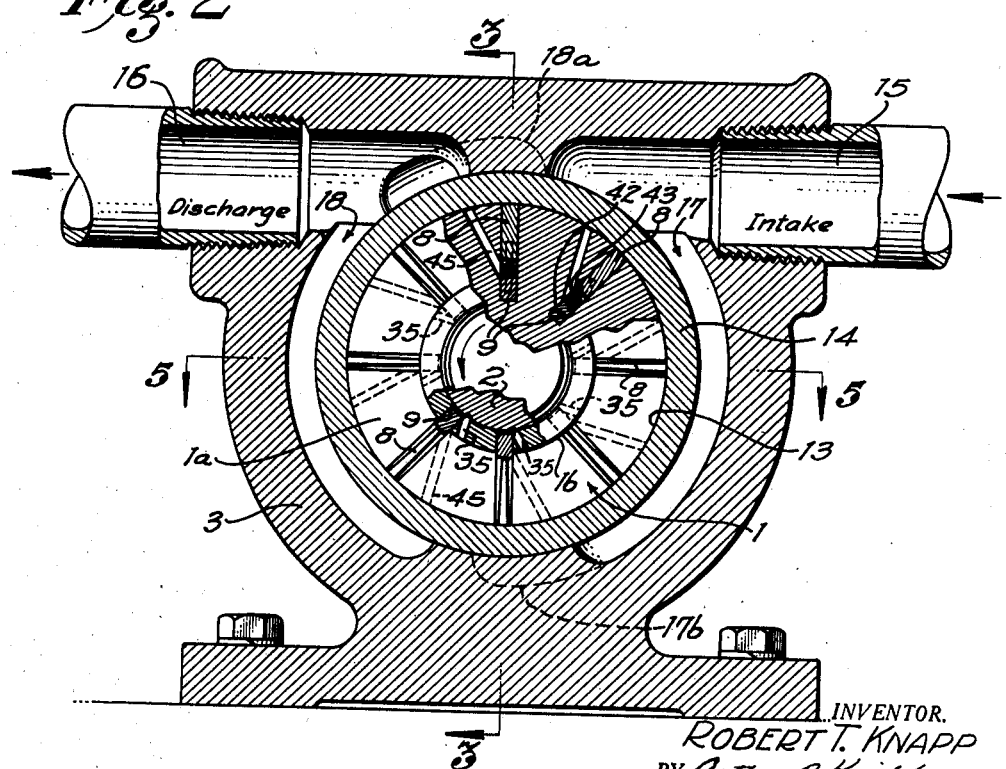
Fig. 2 is a partly broken-away transverse section thereof taken on line 2—2 in Fig. 1.
Figure 6:
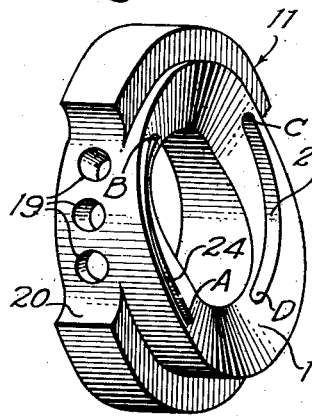
Figure 8:
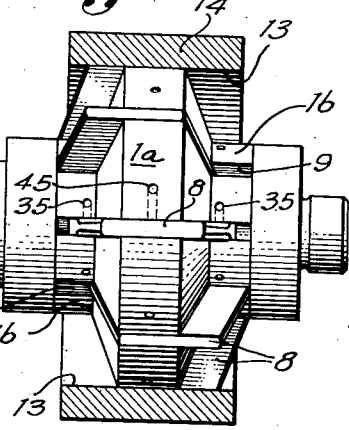
Figure 7:
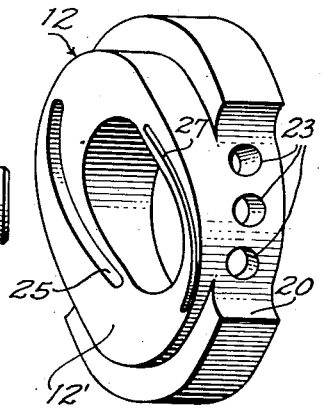
Figure 9:
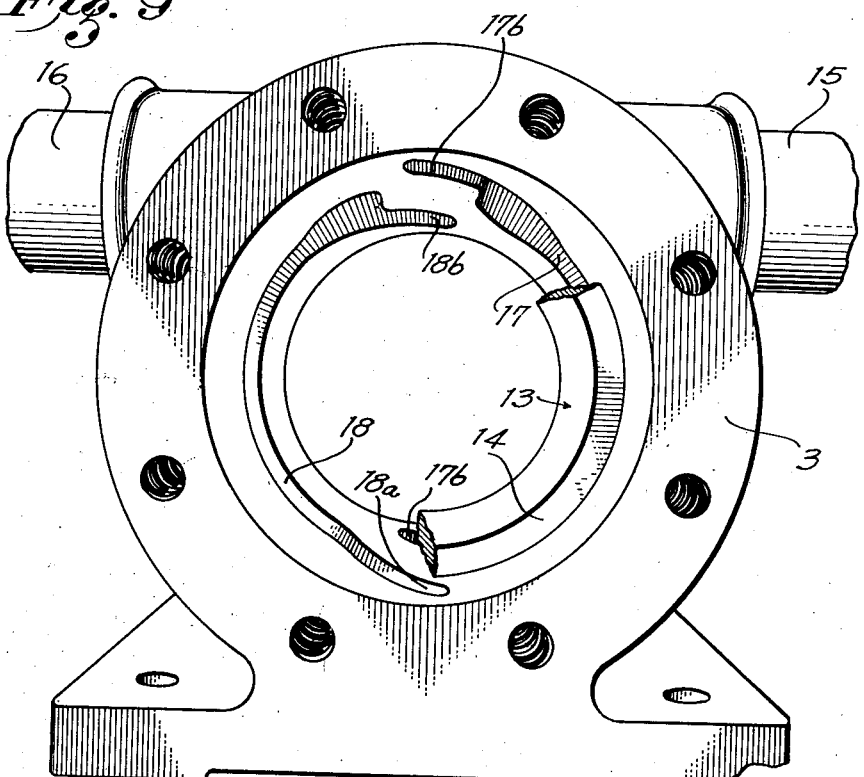

Figs. 6, 7, and 8 represent the two cam plates and the rotor assembly, the rotor assembly being shown in plan view and the cam plates being turned outwardly therefrom and shown in correlated perspective;

Fig. 9 is an axial perspective showing a preferred form of fluid passages which may be provided in the housing or casing portion of the device;

Fig. 10 is a partly broken-away elevation detail of a modified form of vane assembly which may be provided in the present device, looking toward the leading or entering face of the vane;

Fig. 11 is a transverse section thereof taken on line 11—11 in Fig. 10;

Fig. 12 is a top view of the form of vane shown in Figs. 10 and 11;

Fig. 13 is a view corresponding to Fig. 10, showing another modified form of vane construction;

Fig. 14 is a sectional view thereof taken on line 14—14 in Fig. 13;

Fig. 15 is a view corresponding to Fig. 3, showing a further modification of the device;

Fig. 16 is a broken-away end view of the form of device shown in Fig. 15;

Fig. 17 is a face view of one form of cam plate which may be employed for the form of device shown in Figs. 15 and 16, in place of the type of cam plate shown in Figs. 6 and 7; and Fig. 18 is a view corresponding to Figs. 10 and 13, showing a further modified form of vane and fluid passage construction.

Referring to the form shown in Figs. 1 through 9, the device of the present invention may comprise a rotor 1 mounted on a shaft 2 and disposed within a concentric housing 3 provided with end plates 4 and 5 carrying suitable bearings such as shown at 6 and 7 for support of the shaft 2. The rotor 1 is provided with a plurality of vanes 8 slidably disposed within suitable longitudinal slots 9 in the rotor 1 in such manner as to extend transversely with respect to a plane of rotation of said rotor 1. The respective end plates 4 and 5 each carry a cam plate as shown at 11 and 12. The cams 11 and 12 are circular in shape and serve as vane guiding cams; the faces 11' and 12' of these cams are of such a shape as may be generated by the lateral limits of a plane surface which is rotated about the axis of rotation of the shaft 2, said generating plane being moved longitudinally of the shaft 2 and in its own plane during its rotation about said axis so that one or more complete reciprocations are effected in one rotation of 360°.

In the preferred form of the invention shown in Figs. 1 to 9, the cam faces are substantially of such shape as would be generated by the outwardly converging lateral edges of a plane surface of trapezoidal shape rotated about a line parallel to the axis of rotation of the shaft 2 and reciprocated axially. In this manner the cams remain substantially invariant with respect to each other so that the cross-section of the space between them taken upon a plane containing the generating trapezoid is substantially identical in shape with all similarly taken cross-sections, the axial distance between said cams at any given radius being substantially constant circumferentially and equal to the effective axial length of the vanes 8 at that radius. As will be apparent, the cam faces 11' and 12' provide the desired guiding and sealing faces for the lateral edges 8a and 8b of the vanes 8, and an outer guiding and sealing face 13 is provided on the housing 3 against which the outer or peripheral edge 8c of the vanes 8 may bear. The outer face 13 is preferably cylindrical in shape and may be provided by means of an annulus 14 having a press fit within the housing 3, and the inner diameter of the annulus 14 is preferably only slightly greater than the outer diameter of the rotor 1, so as to provide a minimum clearance between said rotor and the face 13, whereby cross-circulation of fluid between the displacement spaces or chambers at the respective axial ends of the rotor is substantially prevented.

The sealing and guiding surfaces 11', 12', and 13 serve to define and enclose a rotor chamber within which the rotor 1 is mounted.

Referring more particularly to Figs. 2 through 5 and 8, the rotor 1 is shown as comprising a main body portion 1a of such diameter as to provide a running fit with the annulus 14, and hub portions 1b of reduced diameter projecting laterally at the respective ends of said body portion. The main body 1a of the rotor is formed as two oppositely disposed truncated cones spaced by an intermediate cylindrical portion which constitutes the outside diameter of the rotor and, as above set forth, fits closely within the annulus 14. The angle which the conical faces make with the axis of the rotor preferably conforms to the angle of inclination of the cam faces 11' and 12' and to the angle which the vane edges 8a and 8b make with the edge 8c as is illustrated in Fig. 3. This is a structurally preferable but not a necessary feature of the construction, particularly where the device is employed for handling a substantial incompressible fluid. The slots 9 are formed in the body portion and hub portions of the rotor 1, and serve to support the vanes in their desired positions and cause the same to rotate with the rotor, while permitting free reciprocation of the vanes under the influence of the guiding cams. The rotor 1 cooperates with the guiding and sealing surfaces 11', 12', and 13 to define separate displacement chambers at the respective ends of the rotor body portion 1a.

As will be seen from the drawings, particularly Fig. 3, each vane 8 may be of a shape comparable to that of an isosceles trapezoid, the longer base of which lies within a slot 9. It is not essential that the "longer base" actually be parallel to the shorter base in view of the fact that this base has no sealing contact with the bottom of the slot 9, and hence may be of any shape as long as the full length thereof lies within the slot 9 at all positions in the reciprocating movement of the vane. The guiding and sealing edges 8a, 8b, and 8c, however, conform to the sides and shorter base of the aforesaid isosceles trapezoid, and bear respectively against the guiding cam faces 11', 12', and 13. The edges 8a and 8b are preferably provided with rounded corners (as more fully shown in Fig. 12) whereby the wear thereon against the cam faces 11' and 12' during that part of the movement of the vanes which occurs along the inclined portions of said cam faces (corresponding to the quadrants A—B and C—D, hereinafter described in connection with Fig. 6), is distributed over said rounded corners. The vanes are of sufficiently greater length than the axial length of the body portion 1a of the rotor, to project beyond said portion at one or both sides (dependent upon the angular position of a particular vane with respect to the cams), and maintain sealing engagement with the cam surfaces 11' and 12', thus dividing the displacement chamber at each side of the body portion 1a into a plurality of sections, as shown in Fig. 5.

In general, the individual vanes will be of such shape that the respective lateral ends thereof will converge with respect to one another outwardly toward the annular sealing surface against which the outer edge of the vane is disposed in operation.

The housing 3 is provided with an inlet 15 and an outlet 16 which communicate respectively with inlet passage 17 and outlet passage 18 arranged along the inner periphery of the housing 3 exteriorly of the annulus 14. The respective passages 17 and 18 are provided with portions which extend laterally outwardly of the annulus 14 as shown more particularly in Figs. 3 and 9 (for communication with certain inlet and discharge ports in the device, as hereinafter described). The cam plates 11 and 12 are provided with one or more inlet ports 19 and 21, respectively, which ports communicate with the above-mentioned laterally extending portions of the inlet passage 17 (said projecting portions being designated at 17a and 17b respectively) and with one or more discharge ports 22 and 23 which may respectively be disposed at approximately 180° from the inlet ports and which communicate with the laterally projecting portions 18a and 18b of the discharge passage 18. In the present described form of device, the respective inlet and discharge ports communicate to the interior of the device, that is, to the fluid displacement chambers at the respective ends of the rotor 1, through circumferentially elongated passages in the cam plates, opening through the cam faces 11' and 12', as indicated at 24, 25, 26, and 27, said passages 24 through 27 being preferably inclined in a spiral form so that the lateral edges 8a and 8b of the vanes 8 will be subjected to uniform wear in passing over these passages. The above-described arrangement of ports is given by way of example only, inasmuch as such ports will depend upon the use to which the device is to be put. For example, the above porting is adaptable primarily for use with a non-compressible fluid such as water, and when a compressible fluid is to be handled by the device, an entirely different type of porting may be employed, as will be apparent to one skilled in the art.

From the above description it may be inferred that the cam faces 11' and 12' are formed upon the end plates 4 and 5. This construction, while entirely feasible, is not at present considered preferable in view of the fact that while the cam faces are preferably made of a wear-resistant material, it is not essential that the end plates 4 and 5 be formed of comparable material. In the actual showings, referring particularly to Fig. 3, the portions of the device on which the cam faces 11' and 12' are formed comprise separate ring-shaped elements 11 and 12 having inner ends of small diameter such that they may set within the annulus 14, and outer ends of somewhat increased diameter so as to abut against the lateral ends of said annulus 14. The respective end plates 4 and 5 may thus be caused to bear directly against the separate members 11 and 12 which carry the cam faces 11' and 12', firmly holding said members in fixed relation with respect to the housing 3. Suitable dowel members (not shown) may be provided, as will be apparent to one skilled in the art, whereby the respective cam faces are placed in the desired orientation with respect to one another and with respect to the inlet and outlet passages 17 and 18. The inner diameter of the members 11 and 12 which provide the faces 11' and 12' is preferably such as to have a relatively small clearance with the hub portions 1b of the rotor 1. The enlarged outer ends of the end plates 4 and 5 are preferably recessed as at 20 adjacent the inlet and discharge ports, so that free flow of fluid between said ports and the respective inlet and outlet passages is provided.

In the above description, the casing or housing 3 is set forth as provided with respective inlet and outlet passage means such as shown at 15 through 18. It will be realized that the respective passages may be reversed in function so that the inlet 15 serves as an outlet, depending upon the direction of rotation of the rotor 1. I have, however, illustrated a specific direction of rotation by arrows in Figs. 1, 2, 3, and 5.

While the specific design of the cam faces 11' and 12' is not of particular moment in connection with the present disclosed features of the device and is obviously subject to wide variation, it may be said that in one common form these cam faces may roughly be divided into 90° quadrants, as may be visualized from Figs. 6 and 7 (these quadrants actually depart somewhat from 90° in the preferred construction of the cam faces, for certain reasons which are not pertinent to the present disclosure). Referring more particularly to Fig. 6, for the purpose of description, these quadrants are illustrated as extending respectively between the four points indicated at A, B, C, and D. The quadrant A—B will represent an intake quadrant for the displacement chamber defined between the cam face 11' and the rotor 1 (assuming the delineated direction of rotation). The axial separation between the cam face 11' and the adjacent inclined face or side wall of the rotor 1 thus increases from the point A to the point B, and as a vane 8 passes from the position A to the position B, fluid is received from the intake 15 and its associated communicating passages 17, 17a, 19, and 24. Within the second quadrant B—C, the axial separation of the cam face 11' from the side wall of the rotor 1 remains unchanged. Upon rotation of the rotor 1, the vanes 8 within this quadrant do not travel transversely to the plane of the rotor and merely conduct the fluid from the quadrant A—B through the quadrant B—C to the quadrant C—D. The quadrant C—D is exactly reversed to the quadrant A—B and the axial separation of the face 11' from the side wall of the rotor 1 gradually diminishes to the clearance value at the point D. During rotation of the rotor 1, the entrapped fluid conveyed through the quadrant B—C is thus gradually forced outwardly of the device in quadrant C—D through the passage 26, thence through the ports 22 into the passages 18b, 18, and 16, as will be apparent to one skilled in the art. The operation of the right-hand side of this device as shown in Fig. 7 is inverted with respect to the operation at the left-hand side of the device, the discharge ports 23 being located at the upper portion of the housing, and the admission of fluid to the device being secured through the inlet ports 21 which communicate with the passage 17b shown at the lower right-hand corner of Fig. 3. In Fig. 5, therefore, the displacement chamber sections 31 and 32 defined by adjacent vanes located within the quadrant A—B at the left side of the device are thus seen to be expanding, and the displacement chamber sections 33 and 34 between these same vanes at the right side are thus seen to be contracting.

As set forth in the above-mentioned issued Patent No. 2,020,611, the necessary close engagement of the vanes with the surfaces which define the displacement chambers is insured by the outward pressure exerted by the vanes 8 due to centrifugal force generated by the rotation of the rotor I. Referring particularly to Figs. 5, 6, and 7, the left-hand end of the vanes within the quadrant A—B (at the position of the chambers 31 and 32) will be subjected to a lower fluid pressure than will the right-hand ends of these vanes (at the position of the chambers 33 and 34), which would ordinarily cause the right-hand ends of these vanes to be forced downwardly into the corresponding slots 9 to a greater extent than the left-hand ends of these same vanes, producing a rocking effect in the plane of the vanes which would ultimately result in an ununiform wear of the vanes so that they would no longer conform to the trapezoidal cross-section of the space between the two cam faces 11' and 12'. To overcome this rocking tendency, and to improve the operating characteristics of the device, I provide means for establishing counterbalancing pressures at the inner edges of the respective vanes, either by providing for direct communication of pressure thereto from within the rotor chamber, or by providing fluid communication thereto from an external source of fluid under pressure or some other source of high, low, or intermediate fluid pressure such as the discharge passage, intake passage, or the like. According to the particular operating characteristics desired in a particular embodiment of the invention, the counterbalancing pressure provided at the inner edges of the vanes may, if desired, be established at a value which is considerably in excess of the inward pressures produced at the outer edges of the vanes due to operation of the device, so that the above-mentioned rocking tendency will be positively overcome, although the invention preferably contemplates establishing substantially equivalent counterbalancing pressures at the inner and outer edges of the vanes within the opposed chambers.

Referring particularly to Figs. 2 through 5, I may provide for establishing such substantially equivalent counterbalancing pressures through the agency of a plurality of passages 35 in the hub portions 1b of the rotor 1 closely adjacent the intersection of the conical side walls of the body portion 1a of the rotor with said hub portions 1b, said passages 35 opening at their outer edges through the periphery of the respective hub portions and communicating at their inner ends with the slots 9 inwardly of the vanes 8. The passages 35 are provided at each side of the rotor body portion 1a, and are preferably disposed adjacent the leading or entering face of the blades or vanes 8 so that, for example, the pressure which exists within an adjacent chamber section, such as the chamber section 34 (Fig. 5), will be communicated to the inner edge 8d of the vane within the slot 9 at that side of the device and rearwardly of that chamber section. In this manner the pressure which exists within the chamber section 32 is communicated to the inner edge of the left-hand end of the centrally disposed vane shown in Fig. 5, and the pressure within the chamber section 34 is communicated to the inner edge of the right-hand end of said vane. The respective ends of the vane are thus exposed to counterbalanced pressures at their radially inward and outward edges, even though the pressure at one end of the vane may be many times that of the pressure at the other end of the vane, thus opposing the above-described tendency for the vane to rock in its own plane.

As may be visualized from Fig. 4, as the vanes 8 are subjected to wear and in view of the fact that the vanes will be forced outwardly against the surfaces 11', 12', and 13, an increased clearance will result between the inner edge 8d of the vane and the bottom of the slot 9, and the pressure difference at opposite sides of the rotor 1 will thus have a tendency to neutralize itself through the bottom portion of the slot underneath the individual vane. For this reason I provide sealing means cooperating with the vane and the slot to provide a seal across said slot to prevent any significant cross-circulation through the slot. This may be accomplished, according to one form of the invention, by providing a modified form of vane having a sealing member which will produce an effective seal at the bottom portion of this slot, such as is shown in Figs. 3 and 4. Referring to these figures, the vanes 8 are shown as cut away to provide a notch 41 at the inner edge 8d, preferably substantially centrally of the length of the vane, and a small sealing member 42 is slidably disposed within the aforesaid notch, said sealing member being of sufficient length to maintain close sealing engagement with the end walls 41a of said notch. The sealing member 42 is of such thickness as to have a minimum side clearance within the slot 9 and is maintained in place therein and in engagement with the bottom of the slot, against the effect of centrifugal force, through the agency of one or more compression springs 43 positioned to bear against the outer edge of the member 42 and against the inner edge of the notch 41. Suitable guide pins or the like may be provided as at 44 for the purpose of maintaining the springs 43 in their desired position.

For the purpose of providing an outward pressure against the central portion of the inward edge of the vanes 8 to counterbalance the radially inward pressure on the central portion of the outward edge 8c of said vanes, and for producing a radially inward pressure on the sealing member 42 to oppose any outward pressure which may be communicated thereto through the slot 9 beneath the edge 8d of the vanes from one side or the other, I preferably provide means for applying the same pressure to the space between the outer edge of the member 42 and the outer edge of the notch 41 as is present at the periphery of the body portion 1a of the rotor 1. For this purpose I may provide a passage 45 within the rotor extending from the periphery of said rotor body portion and communicating with the aforesaid space. The position of the passages 45 with respect to the rotor and the vanes is clearly shown in Figs. 2 and 3, wherein it will be seen that the passages open at the periphery of the rotor at the medial plane of the rotor. It will be appreciated that this position of the passage corresponds to the average pressure between the displacement chambers at the opposite sides of the rotor, which is preferable for the proper operation of the device where the counterbalancing passage is provided in the rotor.

The passages 35 will thus be seen to insure that the vanes 8 are not caused to rock in their planes due to pressure differences at opposite sides of the rotor 1, the sealing member 42 insures that there will be no cross-circulation of fluid through the slots 9 between opposite sides of the rotor 1, and the passage 45 insures that the radially outward ends 8c of the vanes 8 will be forced against the guiding and sealing surface 13 by the centrifugal force generated upon rotation of the rotor 1, independent of any pressure condition in the two displacement chambers or at the periphery of the rotor 1.

As will be seen from Fig. 4, each slot 9 is of sufficient length to accommodate the movement of the corresponding vane 8 through its entire stroke from one side to the other, even though the vane undergoes considerable outward movement due to wear on the edges 8a, 8b, and 8c. The cam plates 11 and 12 overlap the end portions of these slots to varying degrees at one or both ends (according to the rotative position of any particular slot with respect to the cam faces). The clearance spaces thus formed at the ends of the slots (as shown for example at 9a in Fig. 4) will expand or contract, dependent upon whether the vane is moving away from or toward the respective end wall of the particular slot. Such spaces will inevitably entrap portions of the fluid handled by the device, due to unavoidable leakage past the vanes. It will be observed, however, that in the construction herein shown the passages 35 permit free interflow of fluid between the displacement chambers and the aforesaid clearance spaces at a position inwardly of the inward edge 8d of the vanes 8, thus eliminating the trapping of fluid in these spaces and thereby eliminating mechanical drag on the device from this source, without detracting from the volumetric efficiency thereof. In the case of a non-compressible fluid such as water, if such free interflow were not provided the entrapped fluid would form a hydraulic stop or block in the respective ends of the slots, and strongly oppose the reciprocating movement of the vanes.

It will be apparent that other means may be provided for preventing the above-described rocking of the vanes 8 in their planes, and other means may be provided for communicating the peripheral pressure to the underside of the blades as above described. Examples of such alternative constructions are illustraed in Figs. 10 through 16, and referring particularly to Figs. 10 through 12, a rotor is indicated at 51, comprising a shaft portion 52 provided with a thereto-secured concentric sleeve 53 having a plurality of longitudinal slots 54 which are closed at their respective ends through the agency of collars 55, said sleeve 53 being provided with a rotor body 56 which may conform generally to the form of body shown at 1a in Figs. 1 through 9. A vane 57 is shown in place within a slot 54 in the rotor body, said vane being of such width as to fit snugly within the aforesaid slot. Suitable means are provided for preventing cross-circulation between the respective ends of the slot 54 underneath the vane 57, such as one or more sealing members 58 slidably disposed within radial bores 59 formed in the member 53, and biased radially outwardly against the lower edge 57d of the vane 57 through the agency of suitable compression springs 61 bearing at their inner ends against the shaft 52. The sealing members 58 are preferably of a diameter equal to or somewhat greater than that of the slot 54, whereby the thickness of the vane 57 is completely spanned by the flat outward face 62 of said sealing members.

In order to provide the desired application of the peripheral pressure to the inward edge 57d of the vane 57, I provide a concentric space 63 inwardly removed from the bottom of the slot 54, as by forming an annular recess at the inner surface of the sleeve member 53, and direct communication is provided between the aforesaid annular space 63 and the periphery of the rotor body 56 as through the agency of a passage 64 in said rotor body. Communication between the space 63 to the inward edge of the vanes 57 is provided through a short centrally disposed passage 65 opening into the slot 54. In view of the fact that it is convenient to place the passages 59 in communication with the space 63 as by causing said passages to open at their ends into said space, whereby the full peripheral pressure may be exerted upon the inner faces of the sealing members 58, the springs 61 may be made relatively light. In order to provide the desired pressure balancing at the respective longitudinal ends of the vane, the lower corners thereof may be cut away as shown particularly at 60 in Figs. 10 and 12, providing the same function as provided by the passages 35 aforesaid.

As an alternative to the provision of a passage through the rotor body as at 64 in Fig. 11, I may provide an outwardly directed passage through the vane itself, as shown at 71 in Figs. 13 and 14. According to this showing a vane 72 is disposed in a slot 54 in the same general manner as is shown in Figs. 10 and 11, and the above-mentioned sealing members 58 are provided in the rotor portion 53. According to this form of device, the passage 71 serves to communicate the above-described balancing pressure against the inward ends of the members 58, and the direct application of pressure to the underside or edge 72d is provided through the space 54a at the bottom of said vane. As an alternative to the provision of cut-away corners such as are shown at 60 in Figs. 10 and 12, I may provide an outwardly extending passage 73 adjacent each longitudinal end of the vane as illustrated in Fig. 13, such passage opening at its inner end into the slot 54 and at its outer end into the displacement chamber adjacent the vane, thus fulfilling the above-described functions of the passages 35.

Referring to the form of device shown in Figs. 15, 16, and 17, a casing or housing is shown at 3', provided with end plates 4' and 5' carrying a rotor 1' provided with a shaft 2'. The rotor 1' is provided with a plurality of slots 9' extending longitudinally thereof, within which are disposed vanes 8' corresponding in function and position to the vanes 8 above. The vanes 8' may be entirely comparable to the vanes 8 above described, and are shown as extending slidably through slots 80 in cylindrical sealing members 81 which are in turn slidably mounted in radial bores 82 preferably located in the medial plane of the rotor 1', the axes of said bores passing through the center of the respective slots. The diameter of the members 81 and bores 82 is somewhat greater than the width of the slots 9'. The radial bores 82 are preferably extended inwardly of the rotor 1' to a short distance from the center of rotation thereof, so as to leave a body of metal at the center portion thereof, as indicated at 83, a flat-ended drill being preferably employed so that the portion of the member 83 which is immediately inwardly of each bore is flat, the function of which will be hereinafter brought out. According to this embodiment of the device I preferably provide spring means for biasing the members 81 outwardly, so that the bottoms of the slots 80 within the members 81 will be maintained in close engagement with the inward edges of the vanes 8', and said vanes thus biased outwardly and maintained in close engagement with the surface 13' of the annulus 14'. Such spring means may comprise spring members 84 secured to the inner ends of each of the guide members 81, the inner ends of said springs being adapted to rest upon the aforementioned flat faces on the portion 83, as designated at 85. The formation of the bores 82 as above described, will result in the production of an irregular annulus or space 86 concentric with the portion 83. The space 86 is thus in communication with each of the bores 82, and suitable passages 87 are provided in the rotor 1' communicating with said space 86 and the periphery of the rotor 1' after the manner of the passages 64 shown in Figs. 10 and 11, whereby the pressure existing at the periphery of the rotor 1' during operation of the device is communicated to the underside of the sealing member, and thence to the inward edge of the vane.

This form of device may be provided with inlets and outlets 15' and 16' and inlet and outlet passages 17' and 18', after the manner of the form shown in Figs. 1 through 9. The direction of rotation of this particular type of device is shown by the arrow at the right-hand side of Fig. 16, but it will be appreciated that the device is adapted for operation in either direction, the identification of the specific inlets and outlets being made for the purpose of description only, as an example of the functions of these openings and the respective passages communicating therewith, upon a given direction of rotation of the rotor 1'.

In Fig. 17 I have illustrated a form of cam plate which may be used with the device shown in Figs. 15 and 16, which may be provided with a cam face 91 comparable in shape and function to one of the cam faces 11' or 12' above described, and an inner bore 92 of slightly greater diameter than the outer diameter of the hub portion 1a' of the rotor 1' shown in Fig. 16, the outer diameter of the cam portion, illustrated at 93, being of such size as to fit snugly within the overhanging portions of the annulus 14'. The outer flange portion of the cam plate, indicated at 94, is recessed as at 20' after the manner shown at 20 in Figs. 6 and 7, to provide free access of fluid from the extensions of the passages 17' and 18' to the inlet and discharge ports shown generally at 95, which ports communicate with ports 96 located at the inner diameter of the cam face 91 and extending through the respective inlet and discharge quadrants of said cam face (such quadrants being defined by the dot-dash lines A'—C' and B'—D'). In view of the fact that the ports 96 are disposed outwardly of and in communication with the end portions of the slots 9' during the time in which the displacement chamber sections between the adjacent vanes 8' are changing in volume, no passages comparable to those shown at 35 in the first-described form of the invention are necessary in this form of device, the pressure-balancing function being provided by such ports themselves.

It will be obvious, however, that any of the above-described types of rotor and vane constructions may be employed in connection with the type of cam plate shown in Fig. 17.

In Fig. 18 I have illustrated a rotor 101 carried on a shaft portion 102 and carrying vanes 108 having their inner edge portions 108d disposed within slots 109, their lateral ends 108a and 108b in engagement with guiding and sealing faces 111' and 112' and their outer edges 108c in engagement with an annular sealing and guiding surface 113. In this particular embodiment of the invention I have provided a sealing member 120 slidably disposed within the slot 109 and of somewhat less depth than the depth of said slot. The sealing member 120 is adapted to bear outwardly against the inner edge 108d of the vane 108 so as to prevent cross-circulation of fluid between the respective displacement chambers at opposite axial sides of the rotor portion 101a, and spring means are preferably provided inwardly of the sealing member 120 to maintain said member in outward engagement with said vane. Such spring members may comprise one or more springs 121 mounted within inwardly directed bores 122 opening into the slot 109, and a suitable follower or the like may be provided as at 123 for each of the springs 121, bearing against the inner face of the member 120 and serving to seal off the ends of the slot beneath said member 120. In order to provide for application of pressure to the center portion of the inner edge of the vane 108, I preferably provide a passage 124 in the member 120, in communication with a passage 125 in the shaft portion 102 of the device, the passage 124 preferably communicating with a space 126 provided at the central portion of the inner edge 108d of the vane 108, corresponding to the space provided by the notch 41 shown in connection with Figs. 2 to 4, and the passage 125 may communicate with a passage (not shown) in the rotor body portion 101a and thus communicate to the peripheral portion of the rotor after the manner of the passage 45 shown in Figs. 2 to 4, or may communicate with an axial passage in the shaft 102 which is extended to the exterior of the machine and placed in communication with a suitable source of fluid under pressure, as will be apparent to one skilled in the art.

According to the above embodiment, any desired pressure can be communicated to the underside of the vane 108 adjacent the center portion thereof, and in this connection it is desirable to provide fluid communication between the outer end portion of the slot 109 (laterally outwardly of the respective followers 123) and the respective displacement chambers at the corresponding axial sides of the rotor body 101a. For this purpose, the corners of the vanes 108 may be cut away at 108' after the manner shown and described at 60 in Fig. 10, and the end corners of the sealing member 120 may be beveled as at 120' to permit fluid communication between the inner and outer portions of the slot 109 at the ends of said sealing member. Alternatively, the followers 123 may be made of a diameter smaller than the width of the slot 109, wherefore the pressure admitted at the passage 125 will be allowed to communicate over the entire inner surface of the sealing member 120, in which case the ends of the sealing members will not be beveled as at 120', and the sealing member would be provided with quite close engagement at the ends of the slots. Such an arrangement would provide for application of a maximum pressure to the inner edges of the vanes, to insure that the outwardly directed forces would always overbalance the inwardly directed forces and thus adequately prevent any rocking movement of the vanes in their own planes.

As shown in my issued Patent No. 2,020,611, numerous shapes of vanes may be employed in the device of the present invention, such as are shown, for example, in Figs. 14 and 15 of said patent. Similarly, the vanes may be inclined at an angle to the radius, if desired, as shown in Fig. 12 of said patent, or at an angle to the axis as shown in Fig. 13 therein. It will be appreciated that where such modified forms of vanes are employed, the cam surfaces will be generated by a comparably modified generating plane, in accordance with the teaching above set forth. It will be seen that in each of the above-described modifications the vanes are so mounted on the rotor as to permit movement both outwardly of the rotor due to centrifugal force and laterally or transversely of a plane of rotation of the rotor due to the guiding action of the cams. In general, such outward movement or tendency towards movement may be considered as radial and such lateral movement may be considered as axial, even though the actual outward movement may depart from a true radial movement as the angle of the vanes with respect to a radius increases, and the actual lateral movement may depart from a true axial movement as the plane of the vane departs from parallelism with the axis. For the purpose of simplification of terminology, expressions such as "radially inwardly", "radially outwardly", "axially", etc., are employed in the subjoined claims in a general sense, and are intended to include all such departures from truly radial or axial extensions, limits, or directions of movement of the vane members.

It will be appreciated that, as above pointed out, the pressure communicated to the underside or inner edge of the vanes in the present device is not necessarily a pressure which is exactly equal to the inward pressure on the vane at that point, although it is preferable that this balancing pressure be established at a value which is at least equal to or slightly in excess of such inward pressure.

I claim:

1. A rotary machine comprising: a housing provided with a rotor chamber having fluid inlet and fluid outlet passages and an annular sealing and guiding surface; a rotor concentrically mounted within said chamber having a peripheral portion closely spaced from said annular surface, and provided with a plurality of axially reciprocable and radially outwardly movable vanes constrained to rotate therewith and having their outermost edges in sealing engagement with said annular surface; and two opposed guiding and sealing cam members mounted on said housing at the respective axial sides of said rotor and adapted to engage the respective axial ends of said vanes and effect axial reciprocation thereof upon rotation of said rotor; said machine being provided with passage means establishing fluid communication between said rotor chamber exteriorly of said rotor and a radially inward edge portion of each of said vanes.

2. The construction set forth in claim 1, each of said vanes being disposed in a slot provided in said rotor and said passage means establishing such fluid communication to said inward edge portion of each of said vanes at a position within the respective slot.

3. A rotary machine comprising: a housing provided with a rotor chamber having fluid inlet and fluid outlet passages and an annular sealing and guiding surface; a rotor concentrically mounted within said chamber having a peripheral portion closely spaced from said annular surface, and provided with a plurality of axially reciprocable and radially outwardly movable vanes constrained to rotate therewith and having their outermost edges in sealing engagement with said annular surface, said rotor and said vanes constituting a rotor assembly; and two opposed guiding and sealing cam members mounted on said housing at the respective axial sides of said rotor assembly and adapted to engage the respective axial ends of said vanes and effect axial reciprocation thereof upon rotation of said rotor assembly; said rotor assembly being provided with passage means establishing fluid communication between said rotor chamber exteriorly of said rotor and a radially inward edge portion of each of said vanes.

4. A rotary machine comprising: a housing provided with a rotor chamber having fluid inlet and fluid outlet passages and an annular sealing and guiding surface; a rotor concentrically mounted within said chamber having a peripheral portion closely spaced from said annular surface, and provided with a plurality of axially reciprocable and radially outwardly movable vanes constrained to rotate therewith and having their outermost edges in sealing engagement with said annular surface, each of said vanes being disposed in a slot provided in said rotor; two opposed guiding and sealing cam members mounted on said housing at the respective axial sides of said rotor and adapted to engage the respective axial ends of said vanes and effect axial reciprocation thereof upon rotation of said rotor; said rotor being provided with passage means establishing fluid communication between said rotor chamber exteriorly of said rotor and a radially inward edge portion of each of said vanes at a point within the respective slot.

5. A rotary machine comprising: a housing provided with a rotor chamber having fluid inlet and fluid outlet passages and an annular sealing and guiding surface; a rotor concentrically mounted within said chamber having a peripheral portion closely spaced from said annular surface; a plurality of vanes slidably mounted on said rotor, axially reciprocable and outwardly movable with respect thereto and constrained to rotate therewith and having their outermost edges in sealing engagement with said annular surface, each of said vanes being disposed in a slot provided in said rotor; two opposed guiding and sealing cam members mounted on said housing at the respective axial sides of said rotor and adapted to engage the respective axial ends of said vanes and effect axial reciprocation thereof upon rotation of said rotor; each of said vanes being provided with passage means establishing fluid communication between said rotor chamber exteriorly of said rotor and a radially inward edge portion of each of said vanes at a point within the respective slot.

6. A rotary machine comprising: a housing provided with a rotor chamber having fluid inlet and fluid outlet passages and an annular sealing and guiding surface; a rotor concentrically mounted within said chamber having a peripheral portion closely spaced from said annular surface, and provided with a plurality of axially reciprocable and radially outwardly movable vanes constrained to rotate therewith and having their outermost edges in sealing engagement with said annular surface, each of said vanes being disposed in a slot provided in said rotor; and two opposed guiding and sealing cam members mounted on said housing at the respective axial sides of said rotor and adapted to engage the respective axial ends of said vanes and effect axial reciprocation thereof upon rotation of said rotor; said machine being provided with passage means establishing fluid communication between the rotor chamber at each end of and exteriorly of said rotor and a radially inward edge portion of each of said vanes at positions adjacent the respective ends of said vanes and within the respective slot.

7. A rotary machine comprising: a housing provided with a rotor chamber having fluid inlet and fluid outlet passages and an annular sealing and guiding surface; a rotor concentrically mounted within said chamber having a peripheral portion closely spaced from said annular surface, and provided with a plurality of axially reciprocable and radially outwardly movable vanes constrained to rotate therewith and having their outermost edges in sealing engagement with said annular surface, each of said vanes being disposed in a slot provided in said rotor; and two opposed guiding and sealing cam members mounted on said housing at the respective axial sides of said rotor and adapted to engage the respective axial ends of said vanes and effect axial reciprocation thereof upon rotation of said rotor; said rotor and the associated vanes constituting a rotor assembly, and said rotor assembly being provided with passage means establishing fluid communication between the rotor chamber at each end of and exteriorly of said rotor and a radially inward edge portion of each of said vanes at positions adjacent the respective ends of said vanes and within the respective slot.

8. A rotary machine comprising: a housing provided with a rotor chamber having fluid inlet and fluid outlet passages and an annular sealing and guiding surface; a rotor concentrically mounted within said chamber having a peripheral portion closely spaced from said annular surface, and provided with a plurality of axially reciprocable and radially outwardly movable vanes constrained to rotate therewith and having their outermost edges in sealing engagement with said annular surface, each of said vanes being disposed in a slot provided in said rotor; and two opposed guiding and sealing cam members mounted on said housing at the respective axial sides of said rotor and adapted to engage the respective axial ends of said vanes and effect axial reciprocation thereof upon rotation of said rotor, said rotor and the associated vanes constituting a rotor assembly, and said rotor assembly being provided with passage means establishing communication of fluid pressure from the rotor chamber at a position exteriorly of said peripheral portion of said rotor to a radially inward edge portion of each of said vanes at a point within the respective slot and intermediate the ends of such vane.

9. A rotary machine comprising: a housing provided with a rotor chamber having fluid inlet and fluid outlet passages and an annular sealing and guiding surface; a rotor concentrically mounted within said chamber and having hub portions at the respective axial ends thereof and an enlarged body portion disposed intermediate said hub portions and serving to divide said rotor chamber into opposed displacement chambers located at opposite axial sides of said body portion, the periphery of said body portion being closely spaced from said annular surface; a plurality of vanes slidably mounted on said rotor, axially reciprocable and outwardly movable with respect thereto and constrained to rotate therewith and having their outermost edges in sealing engagement with said annular surface, each of said vanes being disposed in a slot provided in said rotor; two opposed guiding and sealing cam members mounted on said housing at the respective axial sides of said rotor and adapted to engage the respective axial ends of said vanes and effect axial reciprocation thereof upon rotation of said rotor, said cam members serving to define the respective outer axial ends of said displacement chambers, and said vanes serving to subdivide the respective displacement chambers into a plurality of peripherally arranged displacement chamber sections; fluid conduit means establishing communication between the periphery of said body portion of said rotor at a position intermediate the respective displacement chambers and the inward edge of each of said vanes at a position within the respective slot; and fluid conduit means establishing communication from the respective displacement chambers exteriorly of said hub portions at positions adjacent each of said vanes to a radially inner edge portion of said vanes at positions within the respective slots at opposite ends of said vanes.

10. A rotary machine comprising: a housing provided with a rotor chamber having fluid inlet and fluid outlet passages and an annular sealing and guiding surface; a rotor concentrically mounted within said chamber having a peripheral portion closely spaced from said annular surface, and provided with a plurality of axially reciprocable and radially outwardly movable vanes constrained to rotate therewith and having their outermost edges in sealing engagement with said annular surface, each of said vanes being disposed in a slot provided in said rotor; two opposed guiding and sealing cam members mounted on said housing at the respective axial sides of said rotor and adapted to engage the respective axial ends of said vanes and effect axial reciprocation thereof upon rotation of said rotor; and a sealing member extending within each of said slots adjacent the inner edge of the respective vane and cooperating with said vane and the walls of said slot to establish a fluid seal intermediate the ends of said slot; said machine being provided with fluid passage means establishing communication between the rotor chamber exteriorly of the rotor at each axial end thereof and the radially inward edges of the vanes at positions within the respective slots and at the respective axial ends of said sealing members.

11. A rotary machine as set forth in claim 10, said sealing members being slidably disposed within the respective slots and constrained to axial sliding movement with the respective vanes.

12. A rotary machine as set forth in claim 10, said sealing members being slidably disposed within the respective slots and constrained to axial sliding movement with the respective vanes, said machine further comprising compression spring means disposed between said vanes and said sealing members.

13. A rotary machine as set forth in claim 10, said sealing members being slidably disposed within said rotor for outward sliding movement, and in sliding frictional engagement with the radially inward edges of the respective vanes.

14. A rotary machine comprising: a housing provided with a rotor chamber having fluid inlet and fluid outlet passages and an annular sealing and guiding surface; a rotor concentrically mounted within said chamber having a peripheral portion closely spaced from said annular surface, and provided with a plurality of axially reciprocable and radially outwardly movable vanes constrained to rotate therewith and having their outermost edges in sealing engagement with said annular surface, each of said vanes being disposed in a slot provided in said rotor; two opposed guiding and sealing cam members mounted on said housing at the respective axial sides of said rotor and adapted to engage the respective axial ends of said vanes and effect axial reciprocation thereof upon rotation of said rotor; and a sealing member extending within each of said slots adjacent the inner edge of the respective vane and cooperating with said vane and the walls of said slot to establish a fluid seal intermediate the ends of said slot; said rotor and the associated vanes comprising a rotor assembly, and said rotor assembly being provided with fluid passage means establishing communication between the rotor chamber exteriorly of the rotor at each axial end thereof and the radially inward edges of the vanes at positions within the respective slots and at the respective axial ends of said sealing members.

15. A rotary machine comprising: a housing provided with a rotor chamber having fluid inlet and fluid outlet passages and an annular sealing and guiding surface; a rotor concentrically mounted within said chamber having a peripheral portion closely spaced from said annular surface, and provided with a plurality of axially reciprocable and radially outwardly movable vanes constrained to rotate therewith and having their outermost edges in sealing engagement with said annular surface, each of said vanes being disposed in a slot provided in said rotor, said rotor and the associated vanes constituting a rotor assembly; two opposed guiding and sealing cam members mounted on said housing at the respective axial sides of said rotor and adapted to engage the respective axial ends of said vanes and effect axial reciprocation thereof upon rotation of said rotor; and a sealing member extending within each of said slots adjacent the inner edge of the respective vane and cooperating with said vane and the walls of said slot to establish a fluid seal intermediate the ends of said slot; said rotor assembly being provided with passage means establishing communication of fluid pressure from the rotor chamber at a position exteriorly of said peripheral portion of said rotor to a radially inward edge portion of each of said vanes at a point within the respective slot and intermediate the ends of such vane.

16. A rotary machine comprising: a housing provided with a rotor chamber having fluid inlet and fluid outlet passages and an annular sealing and guiding surface; a rotor concentrically mounted within said chamber having a peripheral portion closely spaced from said annular surface, and provided with a plurality of axially reciprocable and radially outwardly movable vanes slidably mounted within slots provided in said rotor and constrained to rotate therewith, said vanes having their outermost edges in sealing engagement with said annular surface; two opposed guiding and sealing cam members mounted on said housing at the respective axial sides of said rotor and adapted to engage the respective axial ends of said vanes to effect axial reciprocation thereof upon rotation of said rotor; a sealing member disposed within each of said slots in engagement with the associated vane and constrained to lateral sliding movement therewith; and spring means associated with said sealing member and the respective vane in position to bias said sealing member inwardly into close sealing engagement with said slot; said machine being provided with passage means establishing fluid communication from said rotor chamber at a position exteriorly of said peripheral portion of said rotor to a radially inward edge portion of each of said vanes at a position within the respective slot and outwardly of said sealing member.

17. The invention set forth in claim 16, said machine being also provided with passage means establishing fluid communication between said rotor chamber at the respective axial sides of said rotor and the inward edge portion of each of said vanes at positions within said slots and adjacent the respective axial ends of said vanes.

18. A rotary machine comprising: a housing provided with a rotor chamber having fluid inlet and fluid outlet passages and an annular sealing and guiding surface; a rotor concentrically mounted within said chamber, having a peripheral portion closely spaced from said annular surface, and provided with a plurality of axially reciprocable and radially outwardly movable vanes slidably mounted within slots provided in said rotor and constrained to rotate therewith, said vanes having their outermost edges in sealing engagement with said annular surface; two opposed guiding and sealing cam members mounted on said housing at the respective axial sides of said rotor and adapted to engage the respective axial ends of said vanes to effect axial reciprocation thereof upon rotation of said rotor; and two separate sealing members for each of said slots, said sealing members being slidably disposed within said rotor for outward sliding movement to positions of sliding frictional engagement with the inward edges of the respective vanes, and disposed at positions intermediate the length of the respective slot and spaced from one another along said slot; said rotor and said vanes comprising a rotor assembly, and said rotor assembly being provided with passage means establishing fluid communication from said rotor chamber at a position exteriorly of said peripheral portion of said rotor to a radially inward edge portion of each of said vanes at a position within the respective slot at the space between said sealing members.

19. The invention set forth in claim 18, said machine being also provided with passage means establishing fluid communication between said rotor chamber at the respective axial sides of said rotor and the inward edge portion of each of said vanes at positions within said slots and adjacent the respective axial ends of said vanes.

20. A rotary machine comprising: a housing provided with a rotor chamber having fluid inlet and fluid outlet passages and an annular sealing and guiding surface; a rotor concentrically mounted within said chamber having a peripheral portion closely spaced from said annular surface, and provided with a plurality of axially reciprocable and radially outwardly movable vanes constrained to rotate therewith and having their outermost edges in sealing engagement with said annular surface; two opposed guiding and sealing cam members mounted on said housing at the respective axial sides of said rotor and adapted to engage the respective axial ends of said vanes and effect axial reciprocation thereof upon rotation of said rotor; and passage means communicating with a source of fluid under pressure and adapted to provide a differential pressure balance on said vanes by application of pressure to the radially inner edges thereof at the respective axial ends thereof, to overcome a tendency for such vanes to rock in their own planes due to pressure differences at the respective axial sides of said rotor.

21. A rotary machine comprising: a housing provided with a rotor chamber having fluid inlet and fluid outlet passages and an annular sealing and guiding surface; a rotor concentrically mounted within said chamber having a peripheral portion closely spaced from said annular surface, and provided with a plurality of axially reciprocable and radially outwardly movable vanes constrained to rotate therewith and having their outermost edges in sealing engagement with said annular surface, each of said vanes having their respective axial ends converging with respect to one another outwardly toward said annular surface; two opposed guiding and sealing cam members mounted on said housing at the respective axial sides of said rotor and adapted to engage the respective axial ends of said vanes and effect axial reciprocation thereof upon rotation of said rotor; and passage means communicating with a source of fluid under pressure and adapted to provide a differential pressure balance on said vanes by application of pressure to the radially inner edges thereof at the respective axial ends thereof, to overcome a tendency for such vanes to rock in their own planes due to pressure differences at the respective axial sides of said rotor.

22. A rotary machine comprising: a housing provided with a rotor chamber having fluid inlet and fluid outlet passages and an annular sealing and guiding surface; a rotor concentrically mounted within said chamber having a peripheral portion closely spaced from said annular surface, and provided with a plurality of axially reciprocable and radially outwardly movable vanes constrained to rotate therewith and having their outermost edges in sealing engagement with said annular surface, each of said vanes being disposed in a slot provided in said rotor, said rotor and the associated vanes constituting a rotor assembly; two opposed guiding and sealing cam members mounted on said housing at the respective axial sides of said rotor and adapted to engage the respective axial ends of said vanes and effect axial reciprocation thereof upon rotation of said rotor; and a sealing member extending within each of said slots adjacent the inner edge of the respective vane and movable into sealing relation with respect to said vane and the walls of said slot to oppose fluid circulation between the respective axial sides of said rotor assembly through said slot; said rotor assembly being provided with passage means communicating with a source of fluid under pressure and opening through said rotor assembly at positions adjacent the respective sealing members to establish fluid pressure on said sealing members tending to move the same into said sealing relation.

23. A rotary machine comprising: a housing provided with a rotor chamber having fluid inlet and fluid outlet passages and an annular sealing and guiding surface; a rotor concentrically mounted within said chamber having a peripheral portion closely spaced from said annular surface, and provided with a plurality of axially reciprocable and radially outwardly movable vanes slidably mounted within slots provided in said rotor and constrained to rotate therewith, said vanes having their outermost edges in sealing engagement with said annular surface; two opposed guiding and sealing cam members mounted on said housing at the respective axial sides of said rotor and adapted to engage the respective axial ends of said vanes to effect axial reciprocation thereof upon rotation of said rotor; a sealing member disposed within each of said slots in engagement with the associated vane and constrained to lateral sliding movement therewith; and spring means associated with said sealing member and the respective vane in position to bias said sealing member inwardly into close sealing engagement with said slot; said machine being provided with passage means establishing fluid communication from a source of fluid under pressure to each of said slots at a position outwardly of said sealing member.

ROBERT T. KNAPP.